United States Patent [19]

Wier

[11] Patent Number: 5,178,412
[45] Date of Patent: Jan. 12, 1993

[54] FASTENING DEVICE FOR SECURING A PIVOTABLE ANCHORING FITTING OF A SAFETY BELT SYSTEM TO A LOAD-BEARING PART OF A VEHICLE

[75] Inventor: Franz Wier, Göddingen, Fed. Rep. of Germany

[73] Assignee: TRW Repa GmbH, Alfdorf, Fed. Rep. of Germany

[21] Appl. No.: 750,285

[22] Filed: Aug. 27, 1991

[30] Foreign Application Priority Data

Aug. 31, 1990 [EP] European Pat. Off. ........ 90116751.8

[51] Int. Cl.⁵ ............................................. B60R 22/00
[52] U.S. Cl. .................................... 280/801; 297/468
[58] Field of Search ............... 280/801, 805, 806, 808, 280/748; 297/483, 470, 468

[56] References Cited

U.S. PATENT DOCUMENTS 4,009,510  3/1977  Lindblad ............................. 280/808
4,118,068  10/1978  Föhl .................................... 297/481
4,129,321  12/1978  Garvey ............................... 280/805

FOREIGN PATENT DOCUMENTS 0149131  11/1979  Japan .................................. 280/806

Primary Examiner—Margaret A. Focarino
Assistant Examiner—Paul Dickson
Attorney, Agent, or Firm—Tarolli, Sundheim & Covell

[57] ABSTRACT

In order to reduce the risk of head injuries in a passive safety belt system, the upper anchoring fitting provided with a buckle insert is automatically pivoted in response to loads typical of an accident to a safety position in which the anchoring fitting projects only a minimal amount into the region of a passenger head in a passenger compartment of a vehicle.

5 Claims, 5 Drawing Sheets

FASTENING DEVICE FOR SECURING A PIVOTABLE ANCHORING FITTING OF A SAFETY BELT SYSTEM TO A LOAD-BEARING PART OF A VEHICLE

The invention relates to the fastening of a pivotable anchoring fitting of a safety belt system on a structural part of a vehicle at the height of the head region of a vehicle passenger.

Among the load-bearing parts of a safety belt system there are rigid parts such as fittings which are to be anchored to structural parts of the vehicle and belt buckle assemblies having a buckle and a buckle insert, which are mounted as a rule in advantageous ergonomic positions. In normal driving use, the passenger of the vehicle does not come into contact with these rigid parts. To the contrary, in the evolution of a complex accident situation it cannot be excluded that sensitive human body parts can also come into contact with hard or rigid components of the safety belt system which are sufficiently distant from these human body parts in normal driving use.

In passive safety belt systems the upper anchoring point of the shoulder belt is driven along the upper door frame between the belt fastening position and the belt release position. In normal use no buckle assembly is thus necessary to fasten or release the belt. Nevertheless, in order to make it possible to fasten or release manually the safety belt for example in case of operation failure, a buckle assembly is additionally provided and arranged in the vicinity of the upper anchoring point since the belt winding mechanism is provided at the lower anchoring point. It has however been found that such a buckle assembly, which comprises at least a fitting, a buckle insert and a buckle, can represent a danger for the head region of the vehicle passengers in complex accident sequences.

The invention provides a fastening device for a pivotable anchoring fitting which minimizes the risk of injuries against the rigid anchoring fitting or against the parts connected thereto also under unfavourable conditions of a complex accident sequence.

According to the invention, the fastening device comprises a safety device which holds the anchoring fitting in a safety position pivoted away from the region of the head of the passenger of the vehicle in response to occurrence of loads typical of an accident. Under loads typical of an accident, for example at the beginning of a bounce in a complex accident situation, the anchoring fitting and the rigid parts connected thereto cannot therefore project in the region of the passenger compartment where the head of an passenger can move for example during an overturn of the vehicle. Hence, the anchoring fitting and the parts connected thereto do not represent a significant risk of injury.

A particularly simple and efficient safety device has a spring which urges the anchoring fitting in the direction of the safety position pivoted away from the region of the head. The spring can be permanently active or, according to a particular embodiment of the invention, can be maintained inactive in a normal state before occurrence of loads typical of an accident and released only in response to the traction forces applied to the anchoring fitting upon occurrence of the loads. In another embodiment of the invention the anchoring fitting is attached to an axis journalled in mounting openings of the structural part of the vehicle by means of bearing sleeves made of plastics. The plastics material has such properties as to flow in the free space between the structural part of the vehicle and the anchoring fitting in response to stresses typical of an accident and to thereby block the anchoring fitting in a pivoted position at least close to its safety position.

In a further embodiment of the invention, the axis of the anchoring fitting is journalled in bearing openings which have a widening with a narrow neck portion in the vicinity of the axis such that the axis passes through the narrow neck portion into the widening by material deformation and becomes blocked therein upon occurrence of stresses typical of an accident, in order to block the anchoring fitting fixed to the axis.

It is particularly expedient to use the fastening device according to the invention in a passive safety belt system in which, as mentioned at the beginning, a belt buckle assembly device having a buckle insert and a buckle is drivable along the upper door frame between a belt fastening position and a belt release position.

Other features and advantages of the invention will appear from the ensuing description and in reference to the drawings, in which.

Figure 1:
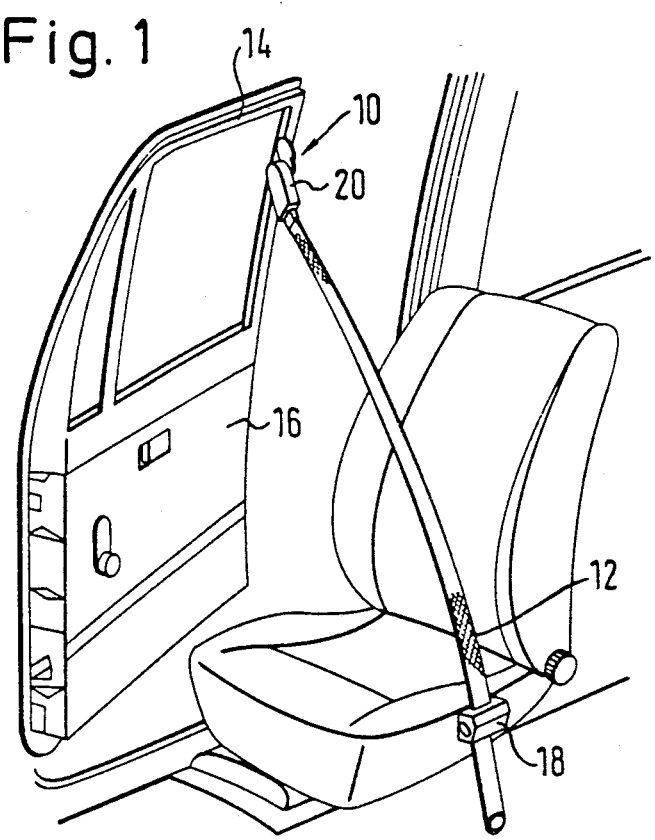
FIG. 1 is a perspective view of a passive safety belt system in a passenger car, the door being partly open.

In the passive safety belt system shown in FIG. 1, the upper anchoring point 10 of the shoulder belt 12 is driven along the upper region of the window frame 14 of a vehicle door 16 between the belt fastening position illustrated in the figure and an advanced belt release position, by means of a slide guided in a rail. The lower end of the shoulder belt 12 is taken by a belt winding mechanism 18 fixed to the vehicle floor. The belt web is locked to an anchoring fitting via a buckle assembly 20 and a buckle insert 22, the anchoring fitting being in turn connected to the slide which is slidable in the guide rail along the upper window frame region of the door 16.

Figure 2A:
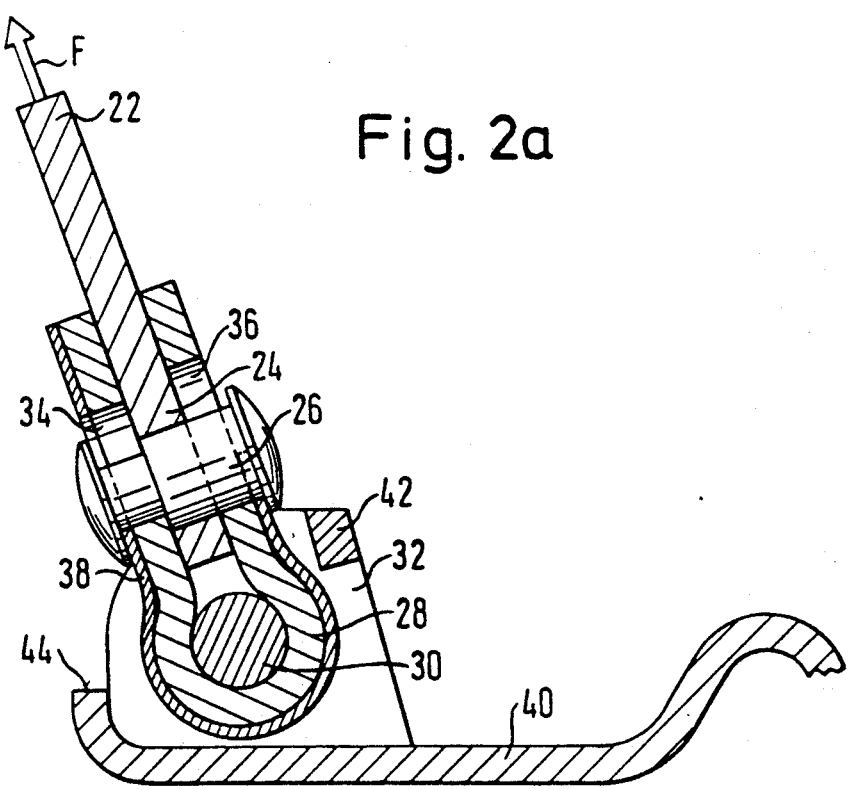
FIGS. 2a, 2b and 2c are views of an embodiment of the fastening device of the invention in three different positions.
Figure 2B:
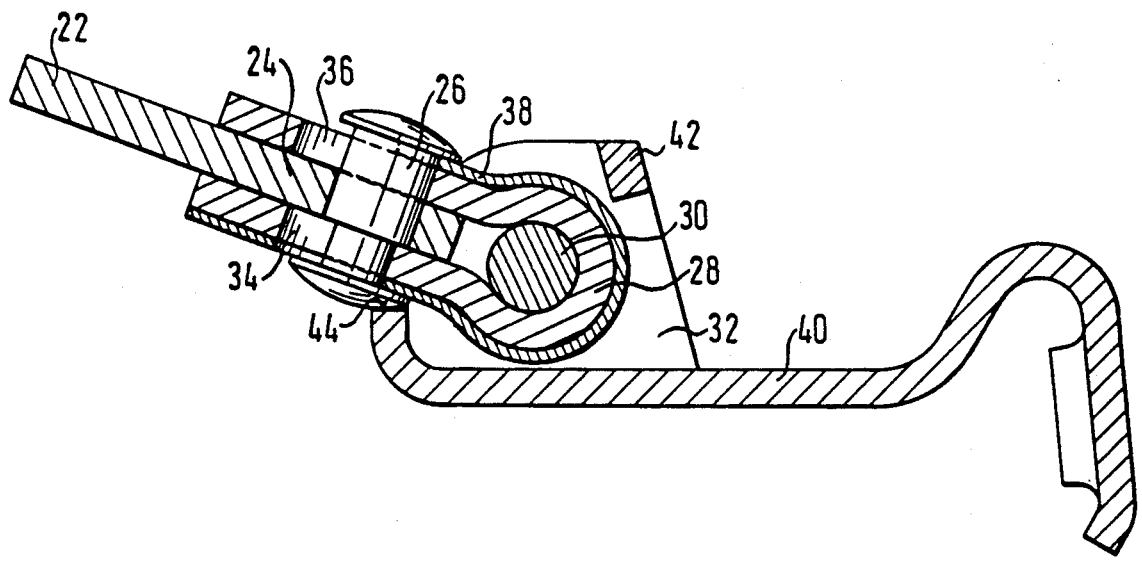
Figure 2C:
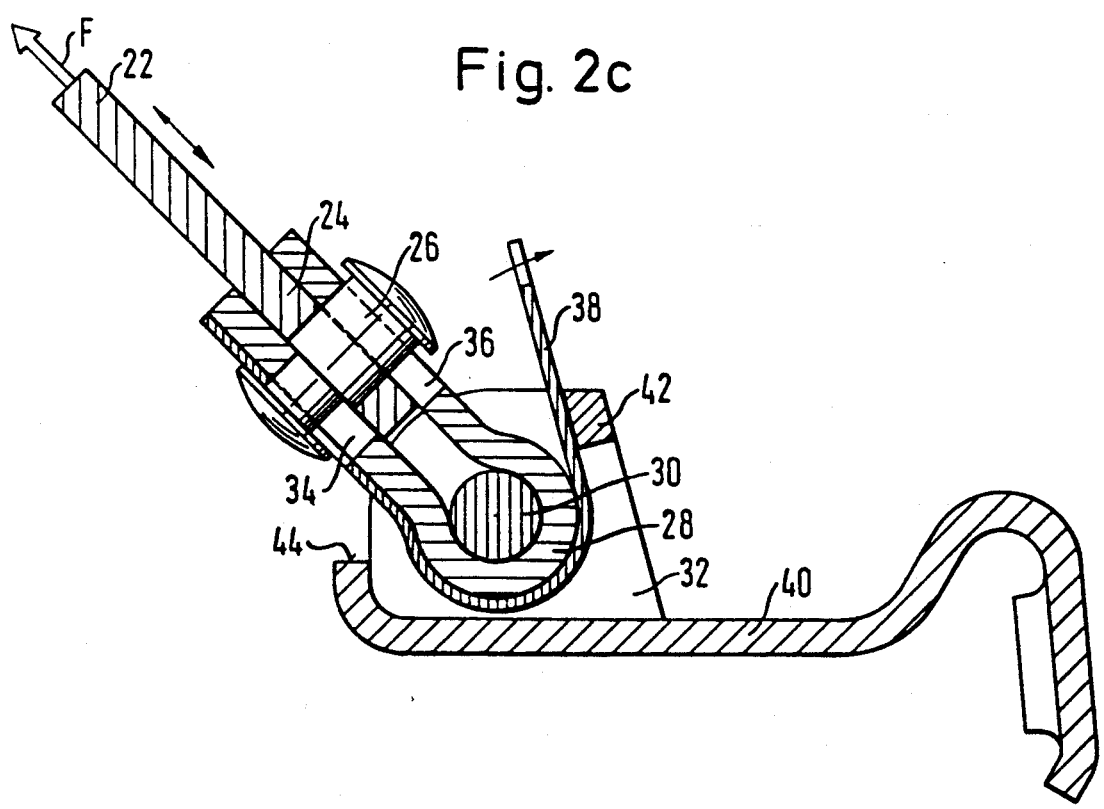

In the embodiment shown in FIGS. 2a, 2b, and 2c, the buckle insert 22 is so designed as to be integral with an anchoring fitting 24, which is in turn connected with a stirrup member 28 by means of a rivet 26. The stirrup member 28 has two parallel legs spaced from one another, between which is held the anchoring fitting 24. The stirrup member 28 has further a curved portion which is fixed to an axis 30. The axis 30 is rotatably held in two bearing sockets 32 distant from one another. The shaft of the rivet 26 extends through a fastening opening of the anchoring fitting 24 and through two openings 34, 36 shaped as elongated bores in the legs of the stirrup member 28. The shaft portion of the rivet 26 is located in the normal condition at the ends of the openings 34, 36 which are close to the axis 30.

Figure 3:
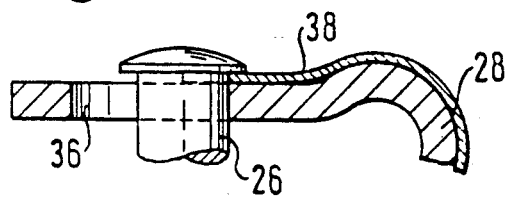
FIG. 3 is a partial cross-section of the fastening device of FIGS. 2a-2c.
Figure 4:
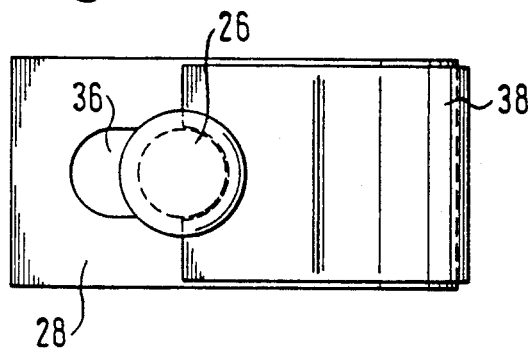
FIG. 4 is a plan view of the part of the fastening device shown in FIG. 3.

A leaf spring 38 extends along one of the legs of the stirrup member 28 and around its curved portion until below the head portion of the rivet 26. In this way, the leaf spring 38 is held under tension between the head portions of the rivet. As seen in FIGS. 3 and 4, one of the ends of the leaf spring 38 engages only partly below the corresponding head portion of the rivet 26 and is U-shaped.

The bearing sockets 32 are secured to a fitting 40, which is in turn joined to the slide in a manner not shown in detail, the fitting 40 and the anchoring fitting 24 being driven jointly with the slide along the upper door frame in the guide rail.

In FIG. 2a, the anchoring fitting 24 and the buckle insert assume a pivoted position limited by an abutment 42 of the bearing socket 32. A second abutment 44 is formed on the fitting 40. Between these two abutments 42, 44 is defined the pivotal range of the anchoring fitting 24 and of the buckle insert 22. Depending on the height and the sitting position of the vehicle passenger the anchoring fitting 24 takes different pivoted positions. In the pivoted position shown in FIG. 2a the anchoring fitting and the buckle insert 22 protrude a significant amount in that part of the passenger compartment in which the head of the passenger is located. Conversely, in the pivoted position shown in FIG. 2b the anchoring fitting 24 and the buckle insert 22 are pivoted out of this head region and placed practically close to the window pane of the door 16. This position illustrated in FIG. 2b is defined as the "safety position".

When, upon occurrence of loads typical of an accident, traction forces are applied in the direction F to the buckle insert 22 and hence to the anchoring fitting 24, a displacement of the rivet 26 in the elongated bore openings 34, 36 of the stirrup member 28 occurs. Due to this displacement in the direction of the force F, one of the head portions of the rivet 26 releases the U-shaped end of the leaf spring 38. The latter is released and bears against the abutment 42, as shown in FIG. 2c, whereby the stirrup member 28 together with the anchoring fitting 24 and the buckle insert 22 are pivoted in the direction of the safety position illustrated in FIG. 2b. Thus the leaf spring 38 remains inactive until occurrence of loads typical of an accident. Only upon occurrence of such loads is the spring potential released in order to pivot the anchoring fitting in the direction of its safety position.

Figure 5:
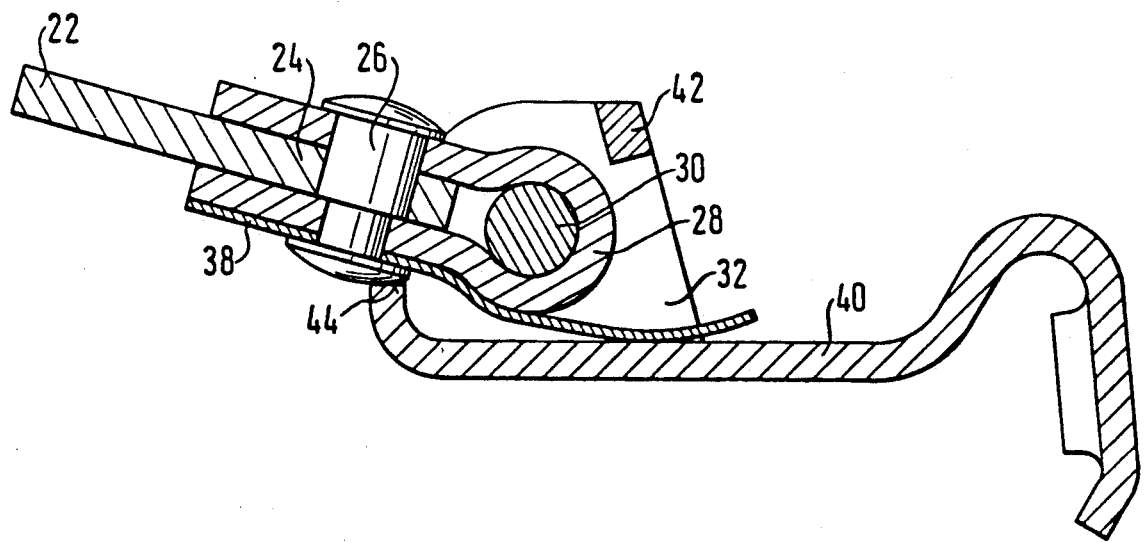
FIG. 5 is a view of a second embodiment of the fastening device.

In the embodiment of FIG. 5 the leaf spring 38 is held firmly under tension at one end below a head portion of the rivet 26, and nevertheless left free at its other end and bears against the inner face of the fitting 40. The leaf spring 38 is thus permanently active and always urges the anchoring fitting towards the abutment 44, thus in the direction of the safety position.

Figure 6:
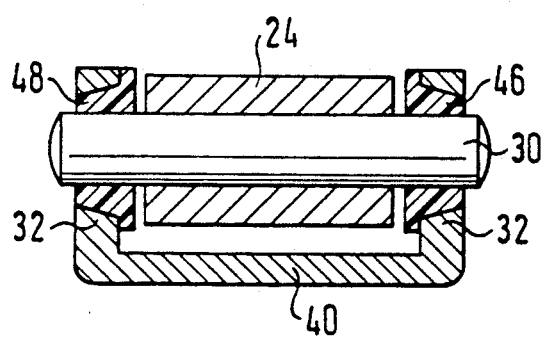
FIG. 6 and 7 are views of a third embodiment of the fastening device.
Figure 7:
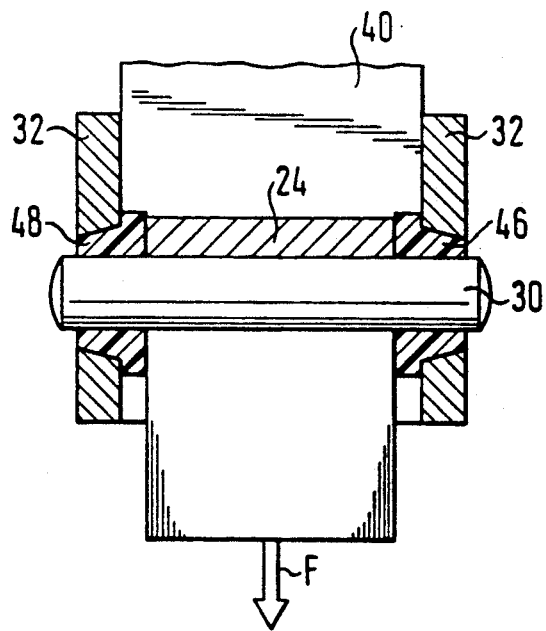

In the embodiment shown in FIGS. 6 and 7 the axis 30 is journalled in the bearing sockets 32 of the fitting 40 by means of two sleeves 46, 48 made of plastics. These plastic sleeves 46, 48 are made of a plastics material having such properties that upon occurrence of stresses typical of an accident the material will flow in the free spaces between the bearing sockets 32 and the anchoring fitting 24. The condition before occurrence of the accident stresses is shown in FIG. 6, and the condition after such occurrence is shown in FIG. 7. As can be seen in FIG. 7, the material of the plastic sleeves 46, 48 comes in direct contact with the anchoring fitting 24 as a result of the flowing, whereby the anchoring fitting is blocked in its current pivoting position. This pivoting position is as a rule at least close to the safety position.

Figure 8:
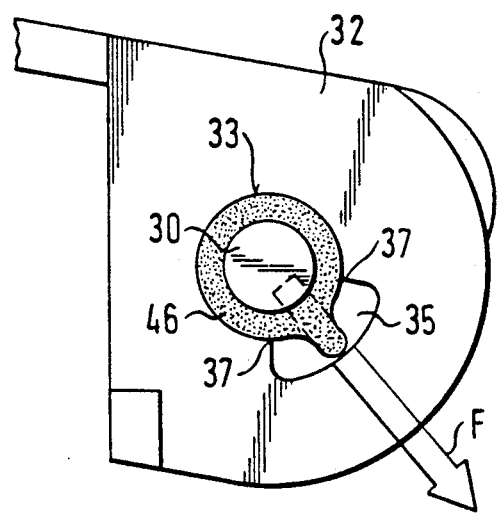
FIG. 8 and 9 are views of a fourth embodiment of the fastening device.
Figure 9:
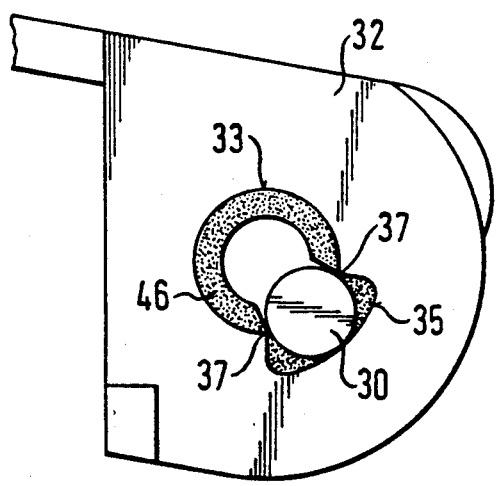

In the embodiment shown in FIGS. 8 and 9 the axis 30 is rotatably mounted in bearing openings 33 of the bearing sockets 32. These bearing openings 33 are circular over a major portion of their periphery and open over the remainder of their periphery towards a widening 35 generally in the direction of the force effective during an accident. Between the widening 35 and the circular portion of the bearing opening 33, a necked portion 37 is effective for normally maintaining the axis in the circular portion. Upon occurrence of stresses typical of an accident, the axis 30 penetrates under material deformation the widening 35, in which the axis 30 is firmly blocked by means of the deformed parts. In this way the anchoring fitting 24 connected to the axis 30 is also blocked in its current pivoting position, which is as a rule close to the safety position. A bearing sleeve 46 is also shown in FIG. 8 and 9, which deforms jointly as the axis 30 penetrates the widening 35. The bearing sleeve 46 can however be omitted if the axis is directly adjusted in the bearing openings 33. The penetration of the axis 30 into the widening 35 results then mainly in a deformation of the metal tips which form the necked portion 37. Thereafter, the deformed metal tips firmly clamp the axis.

I claim:

1. A fastening device for a vehicle safety belt system comprising a pivot bearing mounted on a load-bearing part of the vehicle at a height corresponding to a region of the head of a passenger, an anchoring fitting adapted to be connected to a safety belt mounted on said pivot bearing, said anchoring fitting being movable on said pivot bearing between a first position directed towards said passenger head region and a second position away from said passenger head region, said anchoring fitting being free, in normal use of the safety belt system, to pivot between said first and second positions, and biasing means which are disabled in normal use of the safety belt system and, in response to occurrence of loads typical of an accident, are enabled to urge said anchoring fitting to said second position.

2. The fastening device according to claim 1, wherein said biasing means comprise a spring.

3. The fastening device according to claim 2, wherein said spring is a leaf spring which has a first end fixed directly to said anchoring fitting and a second end shaped and arranged for bearing on said load bearing part of the vehicle.

4. The fastening device according to claim 3, wherein said leaf spring is disabled in normal use by being maintained in a tensioned state and having its second end releasably held on said anchoring fitting, said second end of the leaf spring being adapted to be released in response to traction forces acting on said anchoring fitting upon occurrence of said loads typical of an accident.

5. The fastening device according to claim 4, wherein said anchoring fitting is attached by means of a rivet between two legs of a stirrup member which is in turn fixed to an axis rotatably mounted on said vehicle part, said first end of the leaf spring being fixed to the anchoring fitting by means of said rivet, said second end of the leaf spring being U-shaped and said leaf spring extending away from said rivet along the anchoring fitting and passing around said pivot bearing, and said second end of the leaf spring engaging below a head portion of the rivet, and said rivet extending through elongated openings in the legs of said stirrup member.

* * * * *